US012656814B2

(12) United States Patent
Kim et al.

(10) Patent No.: US 12,656,814 B2
(45) Date of Patent: Jun. 16, 2026

(54) DISPLAY DEVICE

(71) Applicant: Samsung Display Co., LTD., Yongin-si (KR)

(72) Inventors: Youn Joon Kim, Yongin-si (KR); Hee-Suk Namgung, Yongin-si (KR); Minjeong Oh, Yongin-si (KR); Kijune Lee, Yongin-si (KR); Sungeun Lee, Yongin-si (KR); Jinho Ju, Yongin-si (KR); Jonghyun Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 414 days.

(21) Appl. No.: 18/206,808

(22) Filed: Jun. 7, 2023

(65) Prior Publication Data

US 2024/0069593 A1 Feb. 29, 2024

(30) Foreign Application Priority Data

Aug. 23, 2022 (KR) ........................ 10-2022-0105554

(51) Int. Cl.
*G06F 1/16* (2006.01)
(52) U.S. Cl.
CPC .... *G06F 1/1618* (2013.01); *G06F 2200/1613* (2013.01)
(58) Field of Classification Search
CPC ........................ G06F 1/1618; G06F 2200/1613

USPC ........................................................ 455/575.3
See application file for complete search history.

(56) References Cited

U.S. PATENT DOCUMENTS

| | | | | |
|---|---|---|---|---|
| 10,935,708 | B2 | 3/2021 | Lee et al. | |
| 2019/0174645 | A1* | 6/2019 | Jeon | G06F 1/1641 |
| 2020/0166974 | A1* | 5/2020 | Ai | H04M 1/0216 |
| 2021/0356998 | A1 | 11/2021 | Park et al. | |
| 2022/0114923 | A1* | 4/2022 | Ha | G06F 1/1652 |

FOREIGN PATENT DOCUMENTS

| | | |
|---|---|---|
| KR | 1020190062107 A | 6/2019 |
| KR | 1020210142053 A | 11/2021 |

* cited by examiner

*Primary Examiner* — Michael R Neff
(74) *Attorney, Agent, or Firm* — CANTOR COLBURN LLP

(57) ABSTRACT

A display device includes an electronic panel including a first non-folding region, a folding region, and a second non-folding region arranged in a first direction, a support plate disposed under the electronic panel, and a hinge member that defines biaxial rotational axes that are spaced apart from each other in the first direction and that extend in a second direction crossing the first direction. The electronic panel is folded inward or outward about the biaxial rotational axes, and the biaxial rotational axes are defined over or under the support plate depending on a folding direction of the electronic panel.

20 Claims, 18 Drawing Sheets

DM

SDV    CNL    I'    DP

ELm    SLm    DA    NFA2
              NDA
              PL

DL1    DLn

FA    AA1

EDV

PX    SL1    EL1    NFA1

CSL2

CSL1    BA

AA2

DDV    I    PD

BR1    CRA

DR3
DR2 ⊗──► DR1

PLF

CRA

BR1

DR3
DR2 ⊗──► DR1

DISPLAY DEVICE

This application claims priority to Korean Patent Application No. 10-2022-0105554, filed on Aug. 23, 2022, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

In general, a display device includes a display module for displaying an image and a support plate for supporting the display module. The display module includes a display panel that displays an image, a window that is disposed on the display panel and that protects the display panel from external scratches and impacts, and a protective layer that is disposed under the display panel and that protects the display panel from external impacts. The support plate has a higher stiffness than that of the display module and supports the display module.

Nowadays, with the development of display device technologies, flexible display devices capable of being deformed in various forms are being developed. The flexible display devices include a flexible display module that may be folded or rolled. A support plate disposed under a display panel of the flexible display module that is foldable about a folding axis has a structure folded together with the display panel. A plurality of openings may be defined in the support plate to enable the support plate to be more easily folded.

SUMMARY

A region in which the openings of the support plate are defined may have lower impact resistance than that of a region in which the openings are not defined. Accordingly, a technology for improving the impact resistance of the region in which the openings are defined is desired.

Embodiments of the disclosure provide a display device for preventing interference between adjacent branch portions of a folding plate.

In an embodiment, a display device includes an electronic panel including a first non-folding region, a folding region, and a second non-folding region arranged in a first direction, a support plate disposed under the electronic panel, and a hinge member that defines biaxial rotational axes that are spaced apart from each other in the first direction and that extend in a second direction crossing the first direction. The electronic panel is folded inward or outward about the biaxial rotational axes, and the biaxial rotational axes are defined over or under the support plate depending on a folding direction of the electronic panel.

In an embodiment, a display device includes an electronic panel including a first non-folding region, a folding region, and a second non-folding region arranged in a first direction, a support plate that is disposed under the electronic panel and that includes a first flat portion, a folding plate portion, and a second flat portion arranged in the first direction, and a hinge member that defines biaxial rotational axes that are spaced apart from each other in the first direction and that extend in a second direction crossing the first direction.

Openings arranged in the first direction and the second direction are defined in the folding plate portion, and the folding plate portion includes a plurality of branch portions disposed between the openings. Widths of the openings in the first direction when the folding plate portion is folded inward or outward are greater than widths of the openings in the first direction when the folding plate portion is unfolded.

BRIEF DESCRIPTION OF THE DRAWINGS

The above and other embodiments, advantages and features of the disclosure will become apparent by describing in detail embodiments thereof with reference to the accompanying drawings.

FIGS. 7A to 7C are cross-sectional views taken along line I-I' illustrated in FIG. 5.

DETAILED DESCRIPTION

Figure 1:
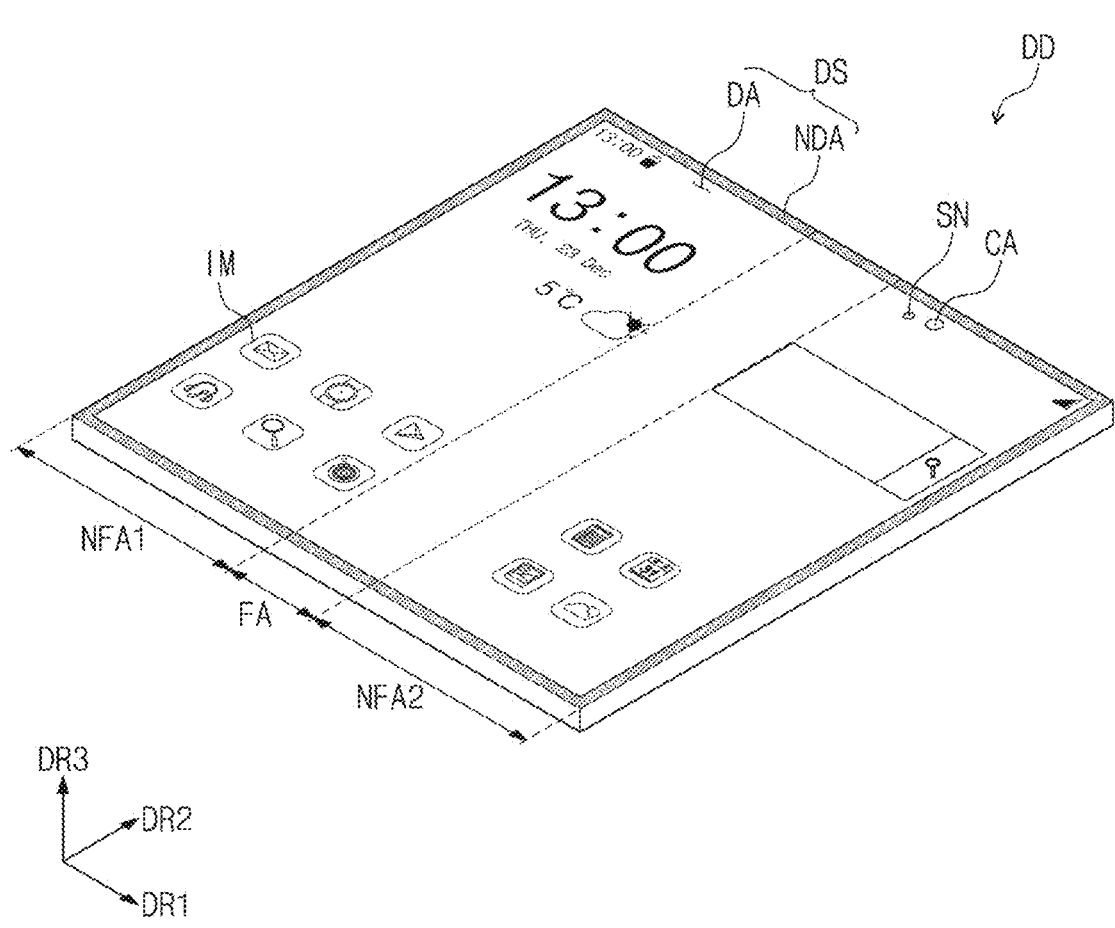
FIG. 1 is a perspective view of an embodiment of a display device according to the disclosure.

The above and other features and advantages of the disclosure will become apparent from the following description of embodiments given in conjunction with the accompanying drawings. However, the disclosure is not limited to the embodiments disclosed herein and may be implemented in various different forms. Herein, the embodiments are provided to provide complete disclosure of the disclosure and to provide thorough understanding of the disclosure to those skilled in the art to which the disclosure pertains, and the scope of the disclosure should be limited only by the accompanying claims and equivalents thereof. Like reference numerals refer to like elements throughout.

When one element or layer is referred to as being "on" another element or layer, it can be directly on the other element or layer, or intervening elements or layers may be present. In contrast, when one element is referred to as being "directly on" another element or layer, there are no intervening elements or layers present. As used herein, the term "and/or" includes each of mentioned items and all combinations of one or more of the items.

Spatially relative terms, such as "below", "beneath", "lower", "above", "upper" and the like, may be used to easily describe a correlation between one element or component and another element or component as illustrated in the drawings. The spatially relative terms should be understood as terms including different directions of an element during use or operation in addition to the direction illustrated in the drawings. Like reference numerals refer to like elements throughout. Although the terms "first," "second," and the like are used herein to describe various elements, components, and/or sections, these elements, components, and/or sections should not be limited by these terms. These terms are only used to distinguish one element, component, or section from another element, component, or section. Accordingly, a first element, a first component, or a first section mentioned below could be termed a second element, a second component, or a second section within the spirit and scope of the disclosure.

Embodiments described herein will be described with reference to plan views and cross-sectional views which are ideal schematic views of the disclosure. Accordingly, the forms of illustrative drawings may be changed according to manufacturing technology and/or allowable errors. Embodiments of the disclosure are not limited to predetermined forms illustrated, but include changes in the forms generated according to manufacturing processes. Regions illustrated in the drawings have schematic properties, and the shapes of the regions illustrated in the drawings illustrate predetermined forms of regions of devices and are not intended to limit the scope of the disclosure.

Hereinafter, embodiments of the disclosure will be described in more detail with reference to the accompanying drawings.

Figure 2A:
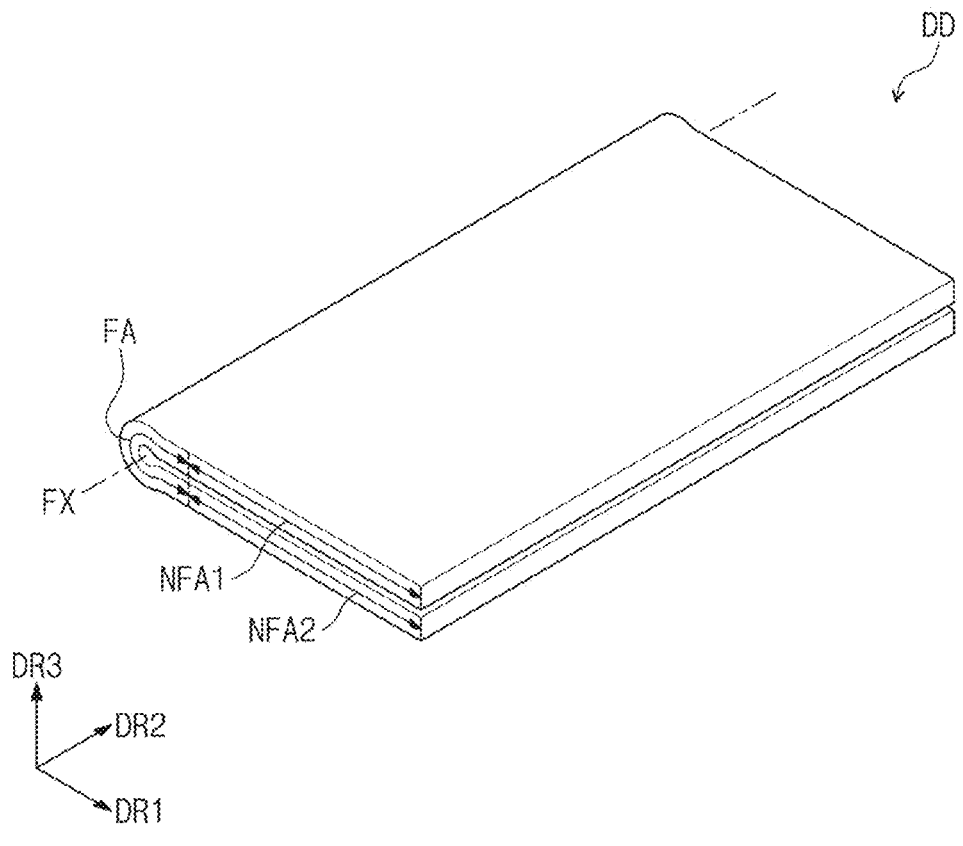
FIGS. 2A and 2B are views illustrating folded states of the display device illustrated in FIG. 1.
Figure 2B:
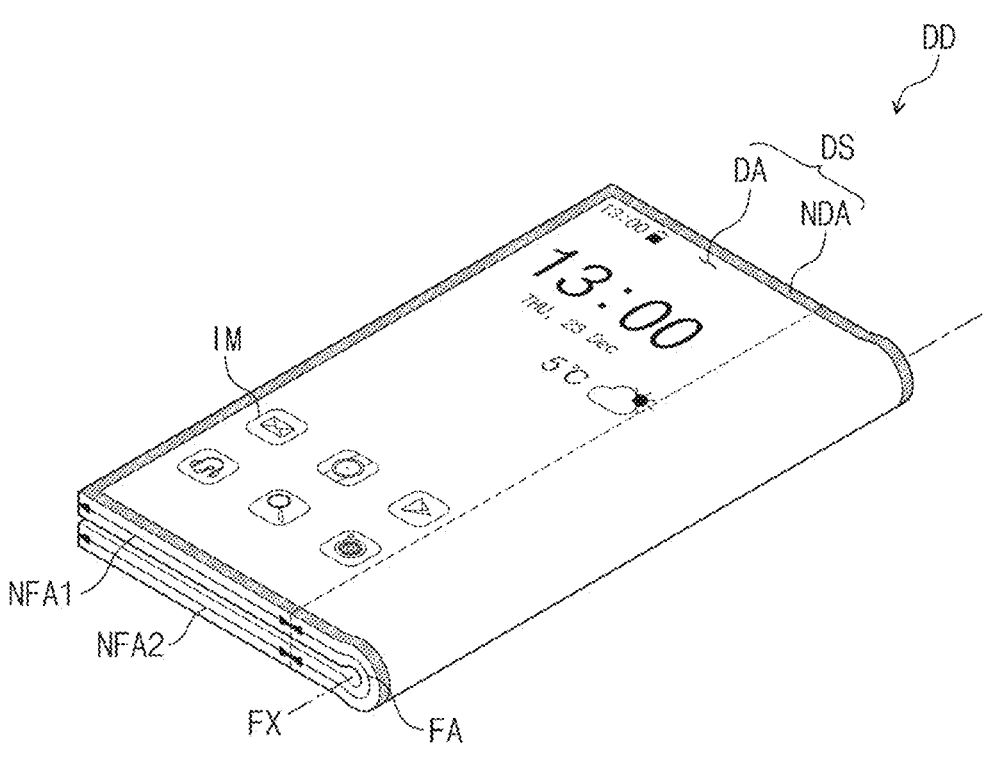
Figure 2B:
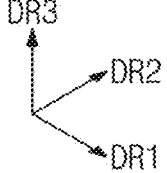

FIG. 1 is a perspective view of an embodiment of a display device according to the disclosure. FIGS. 2A and 2B are views illustrating folded states of the display device illustrated in FIG. 1.

In an embodiment, FIGS. 2A and 2B are views illustrating folded states of the display device DD folded in different directions, for example.

Referring to FIG. 1, the display device DD in an embodiment of the disclosure may have a quadrangular shape, e.g., a rectangular shape with short sides extending in a first direction DR1 and long sides extending in a second direction DR2 crossing the first direction DR1. However, without being limited thereto, the display device DD may have various shapes such as a circular shape, a polygonal shape, or the like. The display device DD may be a flexible display device.

Hereinafter, a direction substantially perpendicular to a plane defined by the first direction DR1 and the second direction DR2 is defined as a third direction DR3 Furthermore, the expression "in the plan view" used herein may mean a view in third direction DR3.

The display device DD may include a folding region FA and a plurality of non-folding regions NFA1 and NFA2. The non-folding regions NFA1 and NFA2 may include the first non-folding region NFA1 and the second non-folding region NFA2. The folding region FA may be disposed between the first non-folding region NFA1 and the second non-folding region NFA2. The folding region FA, the first non-folding region NFA1, and the second non-folding region NFA2 may be arranged in the first direction DR1.

Although one folding region FA and two non-folding regions NFA1 and NFA2 are illustrated in an embodiment, the number of folding regions FA and the number of non-folding regions NFA1 and NFA2 are not limited thereto. In an embodiment, the display device DD may include more than two non-folding regions and a plurality of folding regions disposed between the non-folding regions, for example.

An upper surface of the display device DD may be defined as a display surface DS, and the display surface DS may have a plane defined by the first direction DR1 and the second direction DR2. Images IM generated by the display device DD may be provided to a user through the display surface DS.

The display surface DS may include a display region DA and a non-display region NDA around the display region DA. The display region DA may display an image, and the non-display region NDA may not display an image. The non-display region NDA may surround the display region DA and may define a border of the display device DD that is printed in a predetermined color.

The display device DD may include at least one sensor SN and at least one camera CA. The sensor SN and the camera CA may be adjacent to the border of the display device DD. The sensor SN and the camera CA may be disposed in the display region DA adjacent to the non-display region NDA. The sensor SN and the camera CA may be disposed in the second non-folding region NFA2. However, without being limited thereto, the sensor SN and the camera CA may be disposed in the first non-folding region NFA1.

Light may be provided to the camera CA and the sensor SN through portions of the display device DD where the sensor SN and the camera CA are disposed. In an embodiment, the sensor SN may be a proximity illuminance sensor, for example. However, the type of the sensor SN is not limited thereto. The camera CA may take an external image. A plurality of sensors SN and a plurality of cameras CA may be provided.

Referring to FIGS. 2A and 2B, the display device DD may be a foldable display device DD that is folded or unfolded. In an embodiment, the folding region FA may be bent about a folding axis FX parallel to the second direction DR2, and thus the display device DD may be folded, for example. The folding axis FX may be defined as a long axis parallel to the long sides of the display device DD.

The display device DD may be folded inward such that the first non-folding region NFA1 and the second non-folding region NFA2 face each other and the display surface DS is not exposed to the outside. However, the disclosure is not limited thereto. In an embodiment, as illustrated in FIG. 2B, the display device DD may be folded outward about the folding axis FX such that the display surface DS is exposed to the outside, for example. When the display device DD is folded outward, the first non-folding region NFA1 and the second non-folding region NFA2 may be disposed opposite to each other in the third direction DR3. Hereinafter, the folding axis FX may be defined as biaxial rotational axes RX1 and RX2.

Figure 3:
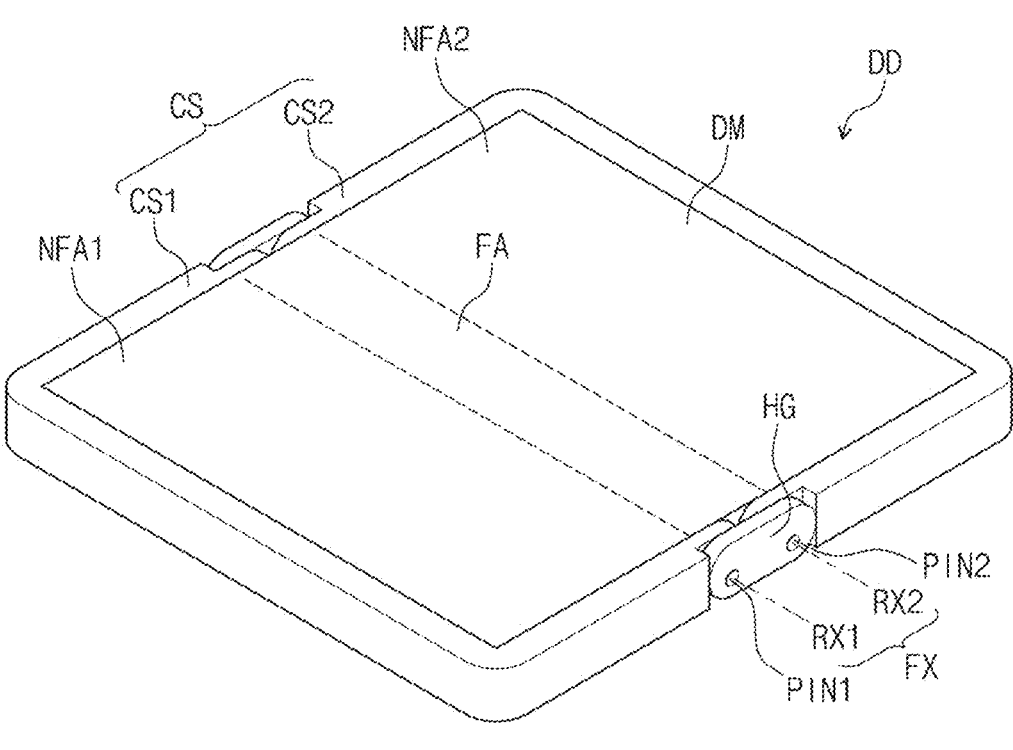
FIG. 3 is a perspective view illustrating a configuration of the display device illustrated in FIG. 1.
Figure 3:
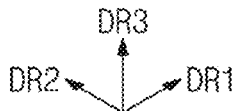

FIG. 3 is a perspective view illustrating a configuration of the display device illustrated in FIG. 1.

Referring to FIG. 3, the display device DD may include a display module DM, a case member CS accommodating the display module DM, and hinge members HG connected to the case member CS to provide the biaxial rotational axes RX1 and RX2.

The display module DM may have a plane defined by the first direction DR1 and the second direction DR2. The display module DM may include first and second non-folding regions NFA1 and NFA2 and a folding region FA like the display device DD described with reference to FIG. 1. The folding region FA and the first and second non-folding regions NFA1 and NFA2 may be arranged in the first direction DR1. A detailed stacked structure of the display module DM will be described below in detail with reference to FIG. 4.

The case member CS may include a first case member CS1 and a second case member CS2. The first case member CS1 and the second case member CS2 may be arranged in the first direction DR1. The first case member CS1 and the second case member CS2 may be connected to each other and may accommodate the display module DM.

The plurality of hinge members HG may be disposed between the first case member CS1 and the second case member CS2. The hinge members HG may be disposed opposite to each other in the second direction DR2. The hinge members HG may be connected to opposite sides of the first case member CS1 that are opposite to each other in the second direction DR2 and opposite sides of the second case member CS2 that are opposite to each other in the second direction DR2.

In an embodiment, first pin units PIN1 may be inserted into the hinge members HG and the opposite sides of the first case member CS1 opposite to each other in the second direction DR2, and second pin units PIN2 may be inserted into the hinge members HG and the opposite sides of the second case member CS2 opposite to each other in the second direction DR2, for example. Accordingly, the hinge members HG may be connected to the first case member CS1 and the second case member CS2 by the first pin units PIN1 and the second pin units PIN2.

The hinge members HG may provide the biaxial rotational axes RX1 and RX2 to the display device DD of FIG. 1. The biaxial rotational axes RX1 and RX2 may include the first rotational axis RX1 and the second rotational axis RX2. The biaxial rotational axes RX1 and RX2 may be spaced apart from each other in the first direction DR1 and may be parallel to each other in the second direction DR2.

The display device DD may be folded to the state of FIG. 2A or 2B by rotating about the first rotational axis RX1 and the second rotational axis RX2. In an embodiment, the display device DD may be folded inward or outward by rotating about the biaxial rotational axes RX1 and RX2, for example.

The first case member CS1 and the second case member CS2, which are connected to the hinge members HG, may rotate about the biaxial rotational axes RX1 and RX2. Accordingly, the display module DM accommodated in the first and second case members CS1 and CS2 may be folded depending on the rotation of the first and second case members CS1 and CS2. The display module DM may be folded inward or outward by rotating about the biaxial rotational axes RX1 and RX2.

Figure 4:
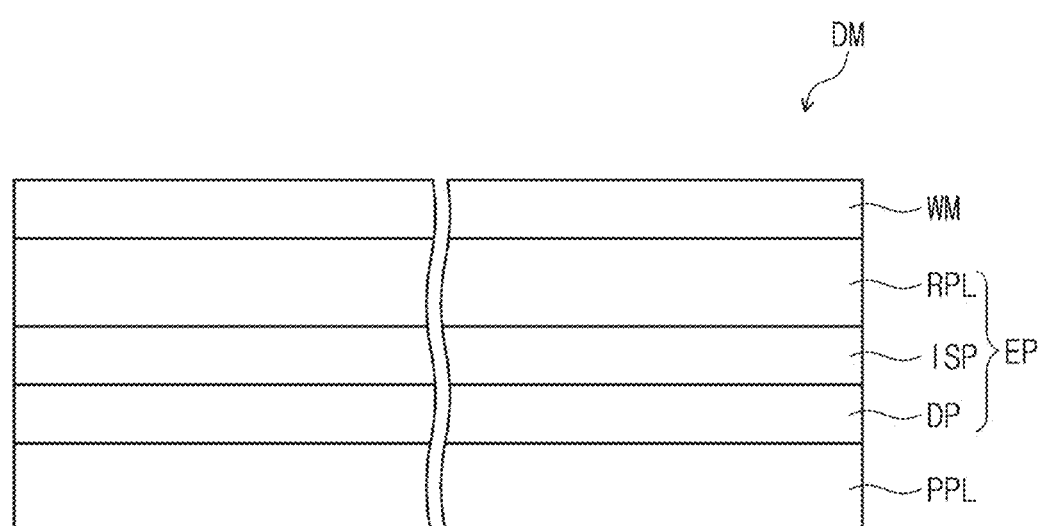
FIG. 4 is a schematic cross-sectional view of a display module illustrated in FIG. 3.

FIG. 4 is a schematic cross-sectional view of the display module illustrated in FIG. 3.

Referring to FIG. 4, the display module DM may include a window module WM, an electronic panel EP disposed under the window module WM, and a panel protection layer PPL disposed under the electronic panel EP. The electronic panel EP may include a display panel DP, an input sensing part ISP disposed on the display panel DP, and an anti-reflection layer RPL disposed on the input sensing part ISP. The display panel DP may be a flexible display panel. In an embodiment, the display panel DP may include a flexible substrate and a plurality of elements disposed on the flexible substrate, for example.

The display panel DP in an embodiment of the disclosure may be an emissive display panel, but is not particularly limited. In an embodiment, the display panel DP may be an organic light-emitting display panel or an inorganic light-emitting display panel, for example. An emissive layer of the organic light-emitting display panel may include an organic light-emitting material. An emissive layer of the inorganic light-emitting display panel may include quantum dots, quantum rods, or the like. Hereinafter, it will be exemplified that the display panel DP is an organic light-emitting display panel.

The input sensing part ISP may include a plurality of sensor parts (not illustrated) for sensing an external input in a capacitive manner. The input sensing part ISP may be directly formed on the display panel DP when the display module DM is manufactured.

The anti-reflection layer RPL may be disposed on the input sensing part ISP. The anti-reflection layer RPL may be directly formed on the input sensing part ISP when the display module DM is manufactured. The anti-reflection layer RPL may be defined as a film for preventing reflection of external light. The anti-reflection layer RPL may decrease the reflectivity of external light incident toward the display panel DP from above the display device DD.

In an embodiment, the input sensing part ISP may be directly formed on the display panel DP, and the anti-reflection layer RPL may be directly formed on the input sensing part ISP, for example. However, the disclosure is not limited thereto. In an embodiment, the input sensing part ISP may be separately manufactured and may be attached to the display panel DP by an adhesive layer, and the anti-reflection layer RPL may be separately manufactured and may be attached to the input sensing part ISP by an adhesive layer, for example.

The panel protection layer PPL may be disposed under the display panel DP. The panel protection layer PPL may protect a lower portion of the display panel DP. The panel protection layer PPL may include a flexible plastic material. In an embodiment, the panel protection layer PPL may include polyethylene terephthalate ("PET"), for example.

The window module WM may be disposed on the electronic panel EP. The window module WM may protect the electronic panel EP from external scratches and impacts. The window module WM may be attached to the electronic panel EP by an optically clear adhesive. An image generated by the electronic panel EP may pass through the window module WM and may be provided to the user.

Figure 5:
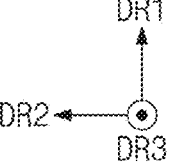
FIG. 5 is a plan view of a display panel illustrated in FIG. 4.

FIG. 5 is a plan view of the display panel illustrated in FIG. 4.

Referring to FIG. 5, the display module DM may include the display panel DP, a scan driver SDV, a data driver DDV, and a light emission driver EDV.

The display panel DP may include a first region AA1, a second region AA2, and a bending region BA between the first region AA1 and the second region AA2. The first region AA1, the bending region BA, and the second region AA2 may be arranged in the first direction DR1, and the bending region BA may extend in the second direction DR2.

The first region AA1 may include a display region DA and a non-display region NDA around the display region DA. The non-display region NDA may surround the display region DA. The display region DA may be a region that displays an image, and the non-display region NDA may be a region that does not display an image. The second region AA2 and the bending region BA may be regions that do not display an image.

The first region AA1, when viewed in the second direction DR2, may include a first non-folding region NFA1, a second non-folding region NFA2, and a folding region FA between the first non-folding region NFA1 and the second non-folding region NFA2. As the folding region FA is folded about the above-described folding axis FX, the display panel DP may be folded.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, a power line PL, a plurality of connecting lines CNL, and a plurality of pads PD. Here, "m" and "n" are natural numbers. The pixels PX may be disposed in the display region DA and may be connected to the scan lines SL1 to SLm, the data lines DL1 to DLn, and the light emission lines EL1 to ELm.

The scan driver SDV and the light emission driver EDV may be disposed in the non-display region NDA. The scan driver SDV and the light emission driver EDV may be disposed in the non-display regions NDA adjacent to opposite sides of the first region AA1 that are opposite to each other in the second direction DR2. The data driver DDV may be disposed in the second region AA2. The data driver DDV may be manufactured in the form of an integrated circuit chip and may be disposed (e.g., mounted) on the second region AA2.

The scan lines SL1 to SLm may extend in the second direction DR2 and may be connected to the scan driver SDV. The data lines DL1 to DLn may extend in the first direction DR1 and may be connected to the data driver DDV via the bending region BA. The light emission lines EL1 to ELm may extend in the second direction DR2 and may be connected to the light emission driver EDV.

The power line PL may extend in the first direction DR1 and may be disposed in the non-display region NDA. The power line PL may be disposed between the display region DA and the light emission driver EDV. However, without being limited thereto, the power line PL may be disposed between the display region DA and the scan driver SDV.

The power line PL may extend to the second region AA2 via the bending region BA. The power line PL may extend toward a lower end of the second region AA2 in the plan view. The power line PL may receive a drive voltage.

The connecting lines CNL may be arranged in the first direction DR1 and may extend in the second direction DR2. The connecting lines CNL may be connected to the power line PL and the pixels PX. The drive voltage may be applied to the pixels PX through the power line PL and the connecting lines CNL connected with each other.

The first control line CSL1 may be connected to the scan driver SDV and may extend toward the lower end of the second region AA2 via the bending region BA. The second control line CSL2 may be connected to the light emission driver EDV and may extend toward the lower end of the second region AA2 via the bending region BA. The data driver DDV may be disposed between the first control line CSL1 and the second control line CSL2.

The pads PD may be disposed adjacent to the lower end of the second region AA2 in the plan view. The data driver DDV, the power line PL, the first control line CSL1, and the second control line CSL2 may be connected to the pads PD.

The data lines DL1 to DLn may be connected to the corresponding pads PD through the data driver DDV. In an embodiment, the data lines DL1 to DLn may be connected to the data driver DDV, and the data driver DDV may be connected to the pads PD corresponding to the data lines DL1 to DLn, for example.

Although not illustrated, a printed circuit board may be connected to the pads PD, and a timing controller and a voltage generator may be disposed on the printed circuit board. The timing controller may be manufactured in the form of an integrated circuit chip and may be disposed (e.g., mounted) on the printed circuit board. The timing controller and the voltage generator may be connected to the pads PD through the printed circuit board.

The timing controller may control operations of the scan driver SDV, the data driver DDV, and the light emission driver EDV. The timing controller may generate a scan control signal, a data control signal, and a light emission control signal in response to control signals received from the outside. The voltage generator may generate the drive voltage.

The scan control signal may be provided to the scan driver SDV through the first control line CSL1. The light emission control signal may be provided to the light emission driver EDV through the second control line CSL2. The data control signal may be provided to the data driver DDV. The timing controller may receive image signals from the outside, may convert the data format of the image signals according to the specification of an interface with the data driver DDV, and may provide the converted signals to the data driver DDV.

The scan driver SDV may generate a plurality of scan signals in response to the scan control signal. The scan signals may be applied to the pixels PX through the scan lines SL1 to SLm. The scan signals may be sequentially applied to the pixels PX.

The data driver DDV may generate a plurality of data voltages corresponding to the image signals in response to the data control signal. The data voltages may be applied to the pixels PX through the data lines DL1 to DLn. The light emission driver EDV may generate a plurality of light emission signals in response to the light emission control signal. The light emission signals may be applied to the pixels PX through the light emission lines EL1 to ELm.

The pixels PX may receive the data voltages in response to the scan signals. The pixels PX may display an image by emitting light having luminance corresponding to the data voltages in response to the light emission signals. Light emission time of the pixels PX may be controlled by the light emission signals.

Figure 6:
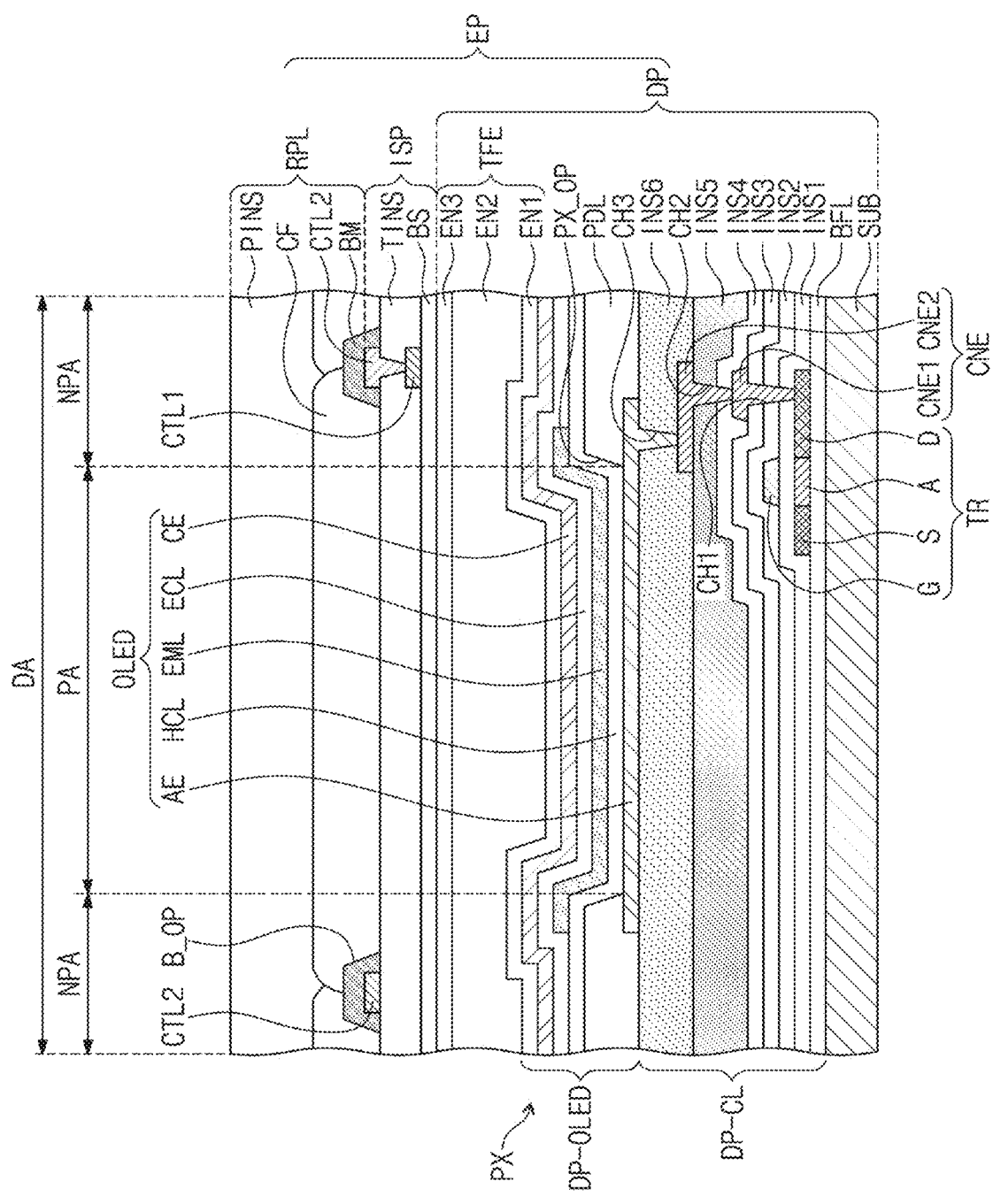
FIG. 6 is a view illustrating a section of an electronic panel corresponding to any one pixel illustrated in FIG. 5.

FIG. 6 is a view illustrating a section of the electronic panel corresponding to any one pixel illustrated in FIG. 5.

Referring to FIG. 6, the pixel PX may include a transistor TR and a light-emitting element OLED. The light-emitting element OLED may include a first electrode AE (or, an anode), a second electrode CE (or, a cathode), a hole control layer HCL, an electron control layer ECL, and an emissive layer EML.

The transistor TR and the light-emitting element OLED may be disposed on a substrate SUB. Although one transistor TR is illustrated in an embodiment, the pixel PX may substantially include a plurality of transistors and at least one capacitor for driving the light-emitting element OLED.

The display region DA may include an emissive region PA corresponding to each of the pixels PX and a non-emissive region NPA around the emissive region PA. The light-emitting element OLED may be disposed in the emissive region PA.

A buffer layer BFL may be disposed on the substrate SUB. The buffer layer BFL may be an inorganic layer. A semiconductor pattern may be disposed on the buffer layer BFL. The semiconductor pattern may include poly silicon, amorphous silicon, or metal oxide.

The semiconductor pattern may be doped with an N-type dopant or a P-type dopant. The semiconductor pattern may include a heavily doped region and a lightly doped region. The heavily doped region may have a higher conductivity than that of the lightly doped region and may substantially serve as a source electrode and a drain electrode of the transistor TR. The lightly doped region may substantially correspond to an active (or, channel) region of the transistor.

A source S, an active region A, and a drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

To connect the transistor TR and the light-emitting element OLED, a connecting electrode CNE may include a first connecting electrode CNE1 and a second connecting electrode CNE2. The first connecting electrode CNE1 may be disposed on the third insulating layer INS3 and may be connected to the drain D through a first contact hole CH1 defined in the first to third insulating layers INS1 to INS3.

A fourth insulating layer INS4 may be disposed on the first connecting electrode CNE1. A fifth insulating layer INS5 may be disposed on the fourth insulating layer INS4. The second connecting electrode CNE2 may be disposed on the fifth insulating layer INS5. The second connecting electrode CNE2 may be connected to the first connecting electrode CNE1 through a second contact hole CH2 defined in the fourth and fifth insulating layers INS4 and INS5.

A sixth insulating layer INS6 may be disposed on the second connecting electrode CNE2. The layers from the buffer layer BFL to the sixth insulating layer INS6 may be defined as a circuit element layer DP-CL. The first to sixth insulating layers INS1 to INS6 may be inorganic layers or organic layers.

The first electrode AE may be disposed on the sixth insulating layer INS6. The first electrode AE may be connected to the second connecting electrode CNE2 through a third contact hole CH3 defined in the sixth insulating layer INS6. A pixel defining film PDL in which an opening PX_OP exposing a predetermined portion of the first electrode AE is defined may be disposed on the first electrode AE and the sixth insulating layer INS6.

The hole control layer HCL may be disposed on the first electrode AE and the pixel defining film PDL. The hole control layer HCL may include a hole transporting layer and a hole injection layer.

The emissive layer EML may be disposed on the hole control layer HCL. The emissive layer EML may be disposed in a region corresponding to the opening PX_OP. The emissive layer EML may include an organic material and/or an inorganic material. The emissive layer EML may generate any one of red light, green light, and blue light.

The electron control layer ECL may be disposed on the emissive layer EML and the hole control layer HCL. The electron control layer ECL may include an electron transporting layer and an electron injection layer. The hole control layer HCL and the electron control layer ECL may be commonly disposed in the emissive region PA and the non-emissive region NPA.

The second electrode CE may be disposed on the electron control layer ECL. The second electrode CE may be commonly disposed for the pixels PX. The layer having the light-emitting element OLED disposed therein may be defined as a display element layer DP-OLED.

A thin-film encapsulation layer TFE may be disposed on the second electrode CE and may cover the pixel PX. The thin-film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include an inorganic insulating layer and may protect the pixel PX from moisture/oxygen. The second encapsulation layer EN2 may include an organic insulating layer and may protect the pixel PX from foreign matter such as dust particles.

A first voltage may be applied to the first electrode AE through the transistor TR, and a second voltage having a lower level than that of the first voltage may be applied to the second electrode CE. Holes and electrons injected into the emissive layer EML may be combined to form excitons, and the light-emitting element OLED may emit light as the excitons transition to a ground state.

The input sensing part ISP may be disposed on the thin-film encapsulation layer TFE. The input sensing part ISP may be directly manufactured on an upper surface of the thin-film encapsulation layer TFE.

A base layer BS may be disposed on the thin-film encapsulation layer TFE. The base layer BS may include an inorganic insulating layer. At least one inorganic insulating layer may be provided on the thin-film encapsulation layer TFE as the base layer BS.

The input sensing part ISP may include a first conductive pattern CTL1 and a second conductive pattern CTL2 disposed on the first conductive pattern CTL1. The first conductive pattern CTL1 may be disposed on the base layer BS. An insulating layer TINS may be disposed on the base layer BS to cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-emissive region NPA. Although not illustrated, the first and second conductive patterns CTL1 and CTL2 may be disposed on the non-emissive region NPA between the emissive regions PA and may have a mesh shape.

The first and second conductive patterns CTL1 and CTL2 may form sensors of the above-described input sensing part ISP. In an embodiment, the first and second conductive patterns CTL1 and CTL2 having a mesh shape may be separated from each other in a predetermined region to form the sensors, for example. A portion of the second conductive pattern CTL2 may be connected to the first conductive pattern CTL1.

The anti-reflection layer RPL may be disposed on the second conductive pattern CTL2. The anti-reflection layer RPL may include a black matrix BM and a plurality of color filters CF. The black matrix BM may overlap the non-emissive region NPA, and the color filters CF may overlap the emissive regions PA.

The black matrix BM may be disposed on the insulating layer TINS to cover the second conductive pattern CTL2. An opening B_OP overlapping the emissive region PA and the opening PX_OP may be defined in the black matrix BM. The black matrix BM may absorb and block light. The width of the opening B_OP may be greater than that of the width of the opening PX_OP.

The color filters CF may be disposed on the insulating layer TINS and the black matrix BM. The color filters CF may be disposed in the openings B_OP, respectively. A planarization insulating layer PINS may be disposed on the color filters CF. The planarization insulating layer PINS may provide a flat upper surface.

When external light travelling toward the display panel DP is reflected from the display panel DP and provided back to the user, the user may visually recognize the external light as in a mirror. To prevent such a phenomenon, the anti-reflection layer RPL may include the color filters CF that display the same colors as those of the pixels PX of the display panel DP. The color filters CF may filter external light with the same colors as the pixels PX. In this case, the external light may not be visible to the user.

However, the disclosure is not limited thereto, and the anti-reflection layer RPL may include a polarizer film to decrease the reflectivity of external light. The polarizer film may be separately manufactured and may be attached to the input sensing part ISP by an adhesive layer. The polarizer film may include a phase retarder and/or a polarizer.

Figure 7A:
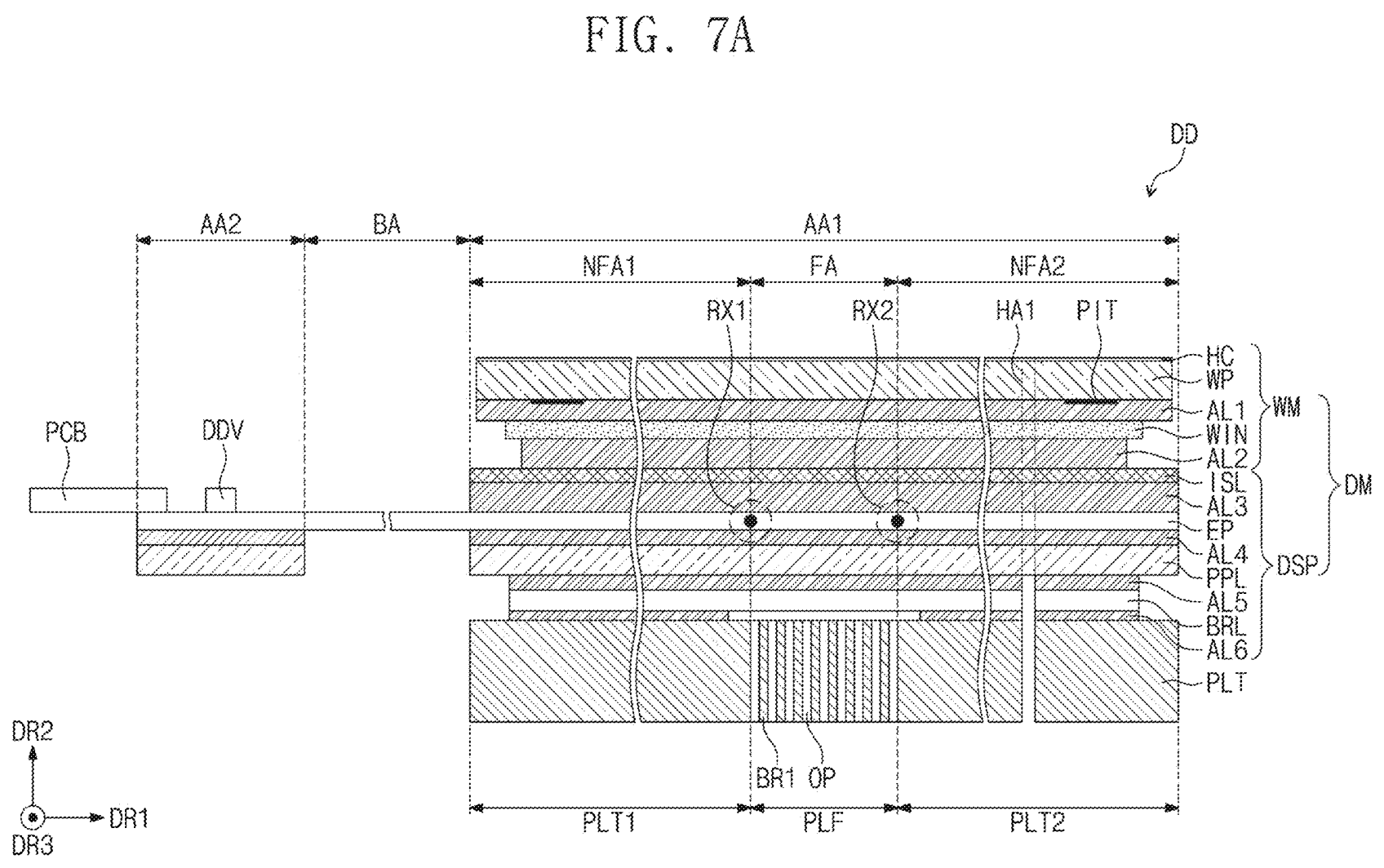
Figure 7B:
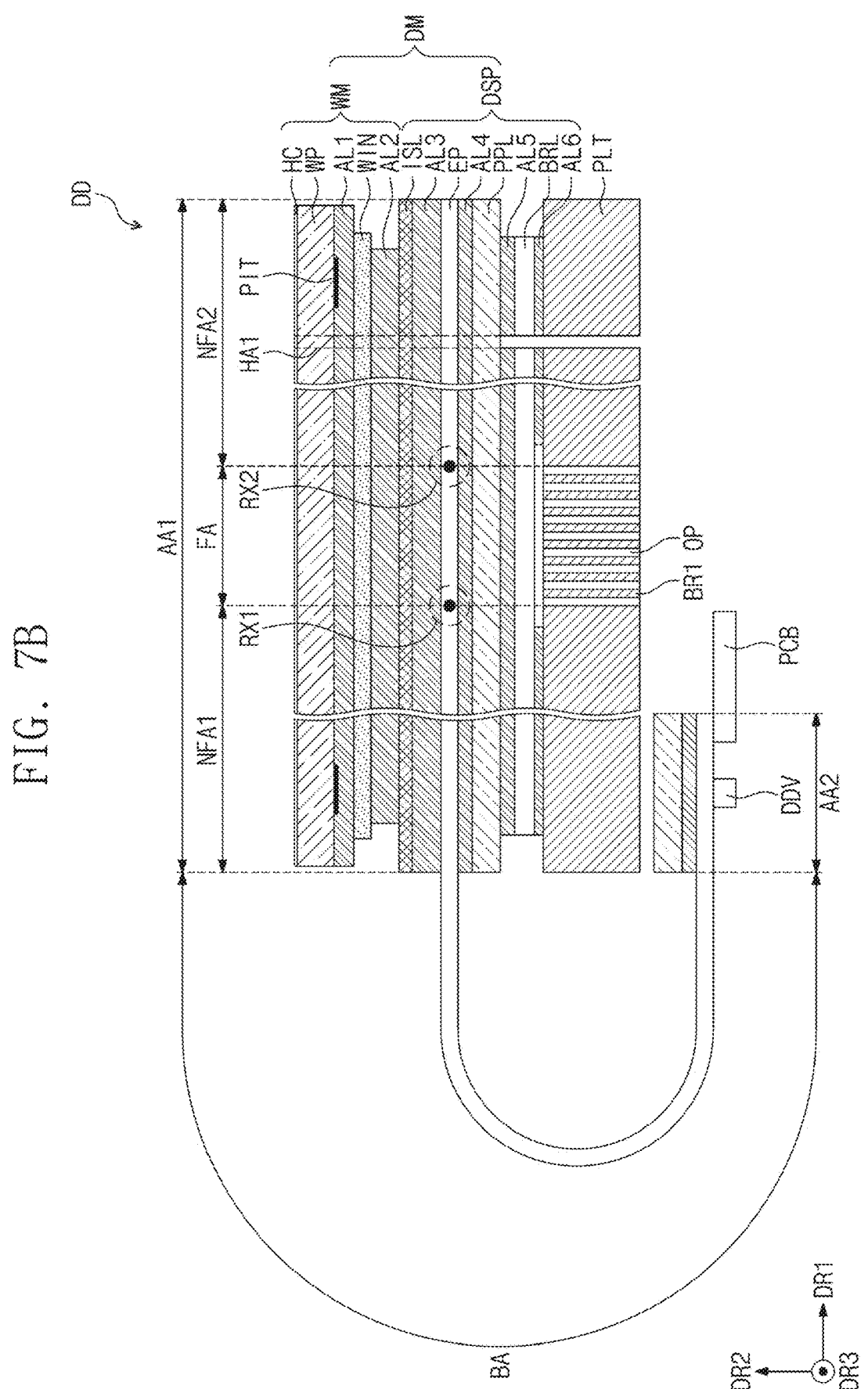
Figure 7C:
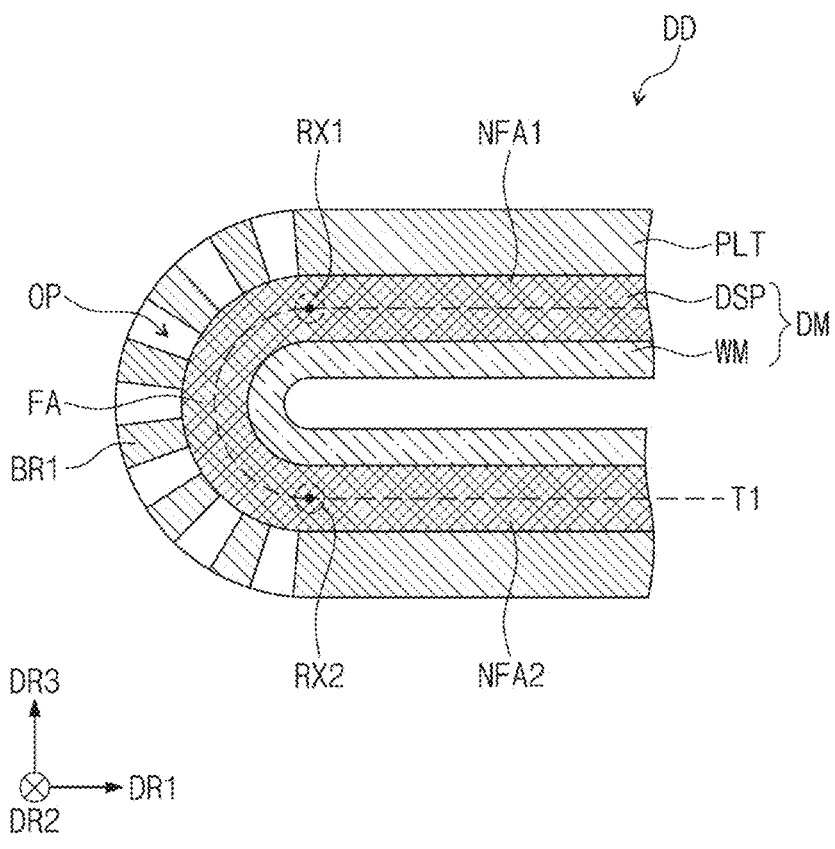
Figure 8:
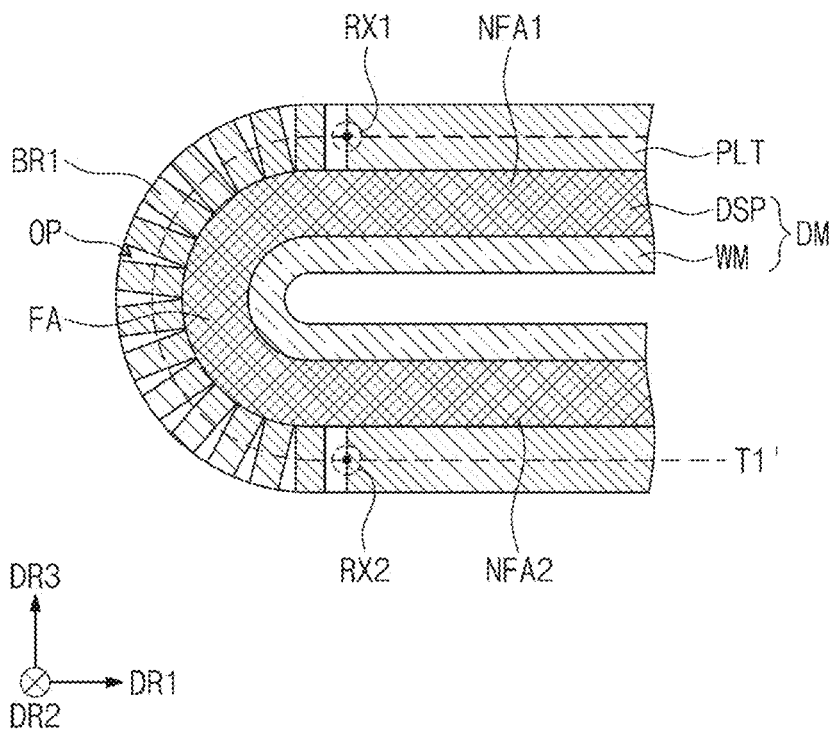
FIG. 8 is a cross-sectional view of an embodiment of the display module in which biaxial rotational axes overlap a support plate according to a comparative embodiment of the disclosure.

FIGS. 7A to 7C are cross-sectional views taken along line I-I' illustrated in FIG. 5. FIG. 8 is a cross-sectional view of the display module in which the biaxial rotational axes overlap a support plate according to a comparative embodiment of the disclosure.

In an embodiment, FIG. 7B is a view illustrating a state in which the bending region illustrated in FIG. 7A is bent, and FIG. 7C is a view illustrating an in-folded state of the display module illustrated in FIG. 7A, for example. FIG. 8 is a view illustrating a state in which the display module is folded inward about the biaxial rotational axes.

Referring to FIG. 7A, the display device DD may include the display module DM and the support plate PLT disposed under the display module DM. The support plate PLT may support the display module DM. The display module DM may include the window module WM and a display part DSP. The display module DM may be a flexible display module. The display module DM may include the first non-folding region NFA1, the folding region FA, and the second non-folding region NFA2.

The display module DM may include the window module WM and the display part DSP disposed under the window module WM. The window module WM may include a window WIN, a window protection layer WP, a hard coating layer HC, and first and second adhesive layers AL1 and AL2. The display part DSP may include the electronic panel EP, an impact absorbing layer ISL, the panel protection layer PPL, a barrier layer BRL, and third to sixth adhesive layers AL3 to AL6. The configurations of the electronic panel EP and the panel protection layer PPL have been described above in detail with reference to FIG. 4, and therefore descriptions thereabout will be omitted.

The impact absorbing layer ISL may be disposed on the electronic panel EP. The impact absorbing layer ISL may protect the electronic panel EP by absorbing an external impact applied toward the electronic panel EP from above the display module DM. The impact absorbing layer ISL may be manufactured in the form of a stretchable film.

The impact absorbing layer ISL may include a flexible plastic material. The flexible plastic material may be defined as a synthetic resin film. In an embodiment, the impact absorbing layer ISL may include a flexible plastic material such as polyimide ("PI") or polyethylene terephthalate ("PET"), for example.

The window WIN may be disposed on the impact absorbing layer ISL. The window WIN may protect the electronic panel EP from external scratches. The window WIN may have a property of being optically transparent. The window WIN may include glass. However, without being limited thereto, the window WIN may include a synthetic resin film.

The window WIN may have a multi-layer structure or a single-layer structure. In an embodiment, the window WIN may include a plurality of synthetic resin films coupled by an adhesive, or may include a glass substrate and a synthetic resin film coupled by an adhesive, for example.

The window protection layer WP may be disposed on the window WIN. The window protection layer WP may include a flexible plastic material such as polyimide or polyethylene terephthalate. The hard coating layer HC may be disposed on an upper surface of the window protection layer WP.

A printed layer PIT may be disposed on a lower surface of the window protection layer WP. The printed layer PIT may be black in color, but the color of the printed layer PIT is not limited thereto. The printed layer PIT may be adjacent to the periphery of the window protection layer WP.

The barrier layer BRL may be disposed under the panel protection layer PPL. The barrier layer BRL may increase resistance to a compressive force caused by external pressing. Accordingly, the barrier layer BRL may serve to prevent deformation of the electronic panel EP. The barrier layer BRL may include a flexible plastic material such as polyimide or polyethylene terephthalate.

The barrier layer BRL may have a color that absorbs light. In an embodiment, the barrier layer BRL may be black in color. In this case, components disposed under the barrier layer BRL may not be visible when the display module DM is viewed from above the display module DM, for example.

The first adhesive layer AL1 may be disposed between the window protection layer WP and the window WIN. The window protection layer WP and the window WIN may be bonded to each other by the first adhesive layer AL1. The first adhesive layer AL1 may cover the printed layer PIT.

The second adhesive layer AL2 may be disposed between the window WIN and the impact absorbing layer ISL. The window WIN and the impact absorbing layer ISL may be bonded to each other by the second adhesive layer AL2.

The third adhesive layer AL3 may be disposed between the impact absorbing layer ISL and the electronic panel EP. The impact absorbing layer ISL and the electronic panel EP may be bonded to each other by the third adhesive layer AL3.

The fourth adhesive layer AL4 may be disposed between the electronic panel EP and the panel protection layer PPL. The electronic panel EP and the panel protection layer PPL may be bonded to each other by the fourth adhesive layer AL4.

The fifth adhesive layer AL5 may be disposed between the panel protection layer PPL and the barrier layer BRL. The panel protection layer PPL and the barrier layer BRL may be bonded to each other by the fifth adhesive layer AL5.

The sixth adhesive layer AL6 may be disposed between the barrier layer BRL and the support plate PLT. Specifically, the support plate PLT may be disposed under the barrier layer BRL, and the sixth adhesive layer AL6 may be disposed between the barrier layer BRL and the support plate PLT. The barrier layer BRL and the support plate PLT may be bonded to each other by the sixth adhesive layer AL6.

The sixth adhesive layer AL6 may overlap the first and second non-folding regions NFA1 and NFA2 and may not overlap the folding region FA. That is, the sixth adhesive layer AL6 may not be disposed in the folding region FA. An opening of the sixth adhesive layer AL6 may have a width of 9.65 millimeters.

The first to sixth adhesive layers AL1 to AL6 may include a transparent adhesive such as a pressure sensitive adhesive ("PSA") or an optically clear adhesive ("OCA"), but are not limited thereto.

The panel protection layer PPL may have a smaller thickness than that of the window protection layer WP, and the barrier layer BRL may have a smaller thickness than that of the panel protection layer PPL. The thickness of the electronic panel EP may be smaller than the thickness of the barrier layer BRL and may be equal to the thickness of the window WIN. The thickness of the impact absorbing layer ISL may be smaller than the thickness of the electronic panel EP.

The thickness of the first adhesive layer AL1 may be equal to the thickness of the barrier layer BRL, and the thicknesses of the second adhesive layer AL2 and the third adhesive layer AL3 may be equal to the thickness of the panel protection layer PPL. The thickness of the fourth adhesive layer AL4 may be equal to the thickness of the fifth adhesive layer AL5.

The thicknesses of the fourth adhesive layer AL4 and the fifth adhesive layer AL5 may be smaller than the thickness of the electronic panel EP and may be greater than the thickness of the impact absorbing layer ISL. The thickness of the sixth adhesive layer AL6 may be smaller than the thickness of the impact absorbing layer ISL. The thickness of the hard coating layer HC may be smaller than the thickness of the sixth adhesive layer AL6.

The electronic panel EP, the impact absorbing layer ISL, the panel protection layer PPL, and the third and fourth adhesive layers AL3 and AL4 may have the same width. The window protection layer WP and the first adhesive layer AL1 may have the same width. The barrier layer BRL and the fifth and sixth adhesive layers AL5 and AL6 may have the same width.

The widths of the electronic panel EP, the impact absorbing layer ISL, the panel protection layer PPL, and the third and fourth adhesive layers AL3 and AL4 may be greater than the widths of the window protection layer WP and the first adhesive layer AL1. The peripheries of the electronic panel EP, the impact absorbing layer ISL, the panel protection layer PPL, and the third and fourth adhesive layers AL3 and AL4 may be disposed outward of the peripheries of the window protection layer WP and the first adhesive layer AL1.

The widths of the window WIN and the second adhesive layer AL2 may be smaller than the widths of the window protection layer WP and the first adhesive layer AL1. The width of the second adhesive layer AL2 may be smaller than the width of the window WIN. The periphery of the window WIN may be disposed inward of the peripheries of the window protection layer WP and the first adhesive layer AL1. The periphery of the second adhesive layer AL2 may be disposed inward of the periphery of the window WIN.

The widths of the barrier layer BRL and the fifth and sixth adhesive layers AL5 and AL6 may be smaller than the widths of the window protection layer WP and the first adhesive layer AL1. The peripheries of the barrier layer BRL and the fifth and sixth adhesive layers AL5 and AL6 may be disposed inward of the peripheries of the window protection layer WP and the first adhesive layer AL1.

The support plate PLT may be disposed under the display part DSP and may support the display part DSP. The support plate PLT may be disposed under the electronic panel EP and may support the electronic panel EP. The width of the support plate PLT may be substantially the same as the width of the electronic panel EP. The support plate PLT may have a higher stiffness than that of the display part DSP. The support plate PLT may include a non-metallic material. In an embodiment, the support plate PLT may include a fiber reinforced composite, for example. The fiber reinforced composite may be carbon fiber reinforced plastic ("CFRP") or glass fiber reinforced plastic ("GFRP").

The support plate PLT including the fiber reinforced composite may be lightened. The support plate PLT including the fiber reinforced composite may be lighter than a metal support plate including or consisting of a metallic material and may have modulus and stiffness similar to those of the metal support plate.

In addition, the support plate PLT including the fiber reinforced composite may be more easily shaped than the metal support plate. In an embodiment, the support plate PLT including the fiber reinforced composite may be more easily shaped through a laser process or a micro-blast process, for example.

The support plate PLT may include a first plat portion PLT1, a folding plate portion PLF, and a second flat portion PLT2. The first flat portion PLT1 may overlap the first non-folding region NFA1. The folding plate portion PLF may overlap the folding region FA. The second flat portion PLT2 may overlap the second non-folding region NFA2.

The folding plate portion PLF may have a plurality of openings OP defined therein. The openings OP may be formed through portions of the support plate PLT in the third direction DR3. The openings OP may be arranged in the first direction DR1 so as to be spaced apart from each other. The openings OP may be formed through the laser process or the micro-blast process mentioned above. The width of the portion in which the openings OP are formed may be smaller than the width of the opening of the sixth adhesive layer AL6.

Since the openings OP are defined in the portion of the support plate PLT that overlaps the folding region FA, the flexibility of the portion of the support plate PLT that overlaps the folding region FA may be increased. Thus, the support plate PLT may be easily folded about the folding region FA.

The folding plate portion PLF may include first branch portions BR1. The first branch portions BR1 may be disposed between the openings OP adjacent to each other in the first direction DR1. More detailed shapes of the openings OP and the first branch portions BR1 will be described below in detail with reference to FIG. 11.

Although not illustrated, the display device DD may further include a digitizer, a shielding layer, and a heat radiating layer disposed under the support plate PLT.

The biaxial rotational axes RX1 and RX2 of the display device DD that is folded inward may be defined over the support plate PLT. The biaxial rotational axes RX1 and RX2 may be defined over the electronic panel EP (e.g., the display panel DP illustrated in FIG. 4). In an embodiment, as illustrated in FIG. 7A, the biaxial rotational axes RX1 and RX2 may overlap the electronic panel EP (e.g., the display panel DP), for example. However, without being limited thereto, the biaxial rotational axes RX1 and RX2 may overlap the window module WM.

The biaxial rotational axes RX1 and RX2 may overlap the region between the first non-folding region NFA1 and the folding region FA and the region between the second non-folding region NFA2 and the folding region FA.

Referring to FIG. 7B, the panel protection layer PPL and the fourth adhesive layer AL4 may not be disposed under the bending region BA. The panel protection layer PPL and the fourth adhesive layer AL4 may be disposed under the second region AA2 of the electronic panel EP. The data driver DDV may be disposed on the second region AA2 of the electronic panel EP.

A printed circuit board PCB may be connected to the second region AA2 of the electronic panel EP. The printed circuit board PCB may be connected to one side of the second region AA2. As the bending region BA is bent, the second region AA2 may be disposed under the first region AA1. Accordingly, the data driver DDV and the printed circuit board PCB may be disposed under the first region AA1.

Referring to FIG. 7C, the display module DM may be folded inward about the biaxial rotational axes RX1 and RX2. The folding region FA may be bent, and thus the first non-folding region NFA1 and the second non-folding region NFA2 may face each other.

The display module DM may be changed from a first state (a flat state) illustrated in FIG. 7A to a second state (a folded state) illustrated in FIG. 7C, or may be changed from the second state to the first state. Such a folding motion may be repeatedly performed.

Referring to FIG. 8, when the biaxial rotational axes RX1 and RX2 overlap the support plate PLT, a compressive force may act on a region inward of a virtual curve T1' passing through the biaxial rotational axes RX1 and RX2 (e.g., a region facing toward the display module). A tensile force may act on a region outward of the virtual curve T1' (e.g., a region facing toward a lower surface of the support plate).

The compressive force may act on upper surfaces of the first branch portions BR1 disposed inward of the virtual curve T1'. The tensile force may act on lower surfaces of the first branch portions BR1 disposed outward of the virtual curve T1'. The upper surfaces of the first branch portions BR1 may be defined as surfaces facing the display part DSP. The lower surfaces of the first branch portions BR1 may be defined as surfaces opposite the upper surfaces.

As the compressive force acts on the upper surfaces of the first branch portions BR1, the gaps between the adjacent upper surfaces may be made smaller. Accordingly, when the display module DM is folded, an interference phenomenon in which the adjacent upper surfaces of the first branch portions BR1 contact each other may occur. The support plate PLT may be damaged by the interference phenomenon.

Referring to FIG. 7C, the biaxial rotational axes RX1 and RX2 may be disposed over the support plate PLT, and the display module DM may be rotated and folded about the biaxial rotational axes RX1 and RX2. In this case, a compressive force may act on a region inward of a virtual curve T1 with respect to the virtual curve T1 passing through the biaxial rotational axes RX1 and RX2. A tensile force may act on a region outward of the virtual curve T1.

In an embodiment, the compressive force may act on an upper surface of the display part DSP disposed inward of the virtual curve T1 and an upper surface and a lower surface of the window module WM disposed inward of the virtual curve T1, for example. The tensile force may act on a lower surface of the display part DSP disposed outward of the virtual curve T1 and the support plate PLT disposed outward of the virtual curve T1. The tensile force may act on an upper surface and the lower surface of the support plate PLT.

Accordingly, the widths of the openings OP defined between the first branch portions BR1 may be made larger when the folding plate portion PLF of the support plate PLT is folded as illustrated in FIG. 7C than when the folding plate portion PLF of the support plate PLT is unfolded as illustrated in FIG. 7A. The gaps between the adjacent first branch portions BR1 may be made larger when the folding plate portion PLF of the support plate PLT is folded than when the folding plate portion PLF of the support plate PLT is unfolded. In an embodiment, the gaps between the adjacent upper surfaces of the first branch portions BR1 may be made larger when the folding plate portion PLF is folded than when the folding plate portion PLF is unfolded, for example. The gaps between the adjacent lower surfaces of the first branch portions BR1 may be made larger when the folding plate portion PLF is in a folded state than when the folding plate portion PLF is in an unfolded state.

Accordingly, the widths of the openings OP defined between the adjacent first branch portions BR1 are made larger by the tensile force when the folding plate portion PLF is folded than when the folding plate portion PLF is unfolded. Thus, the interference phenomenon in which the adjacent first branch portions BR1 contact each other may be prevented.

Figure 9A:
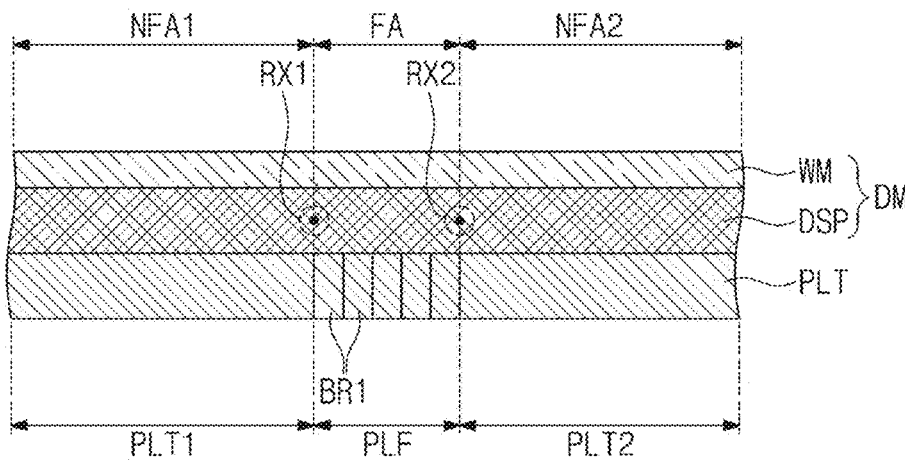
FIGS. 9A and 9B are cross-sectional views of an embodiment of a display device according to the disclosure.
Figure 9B:
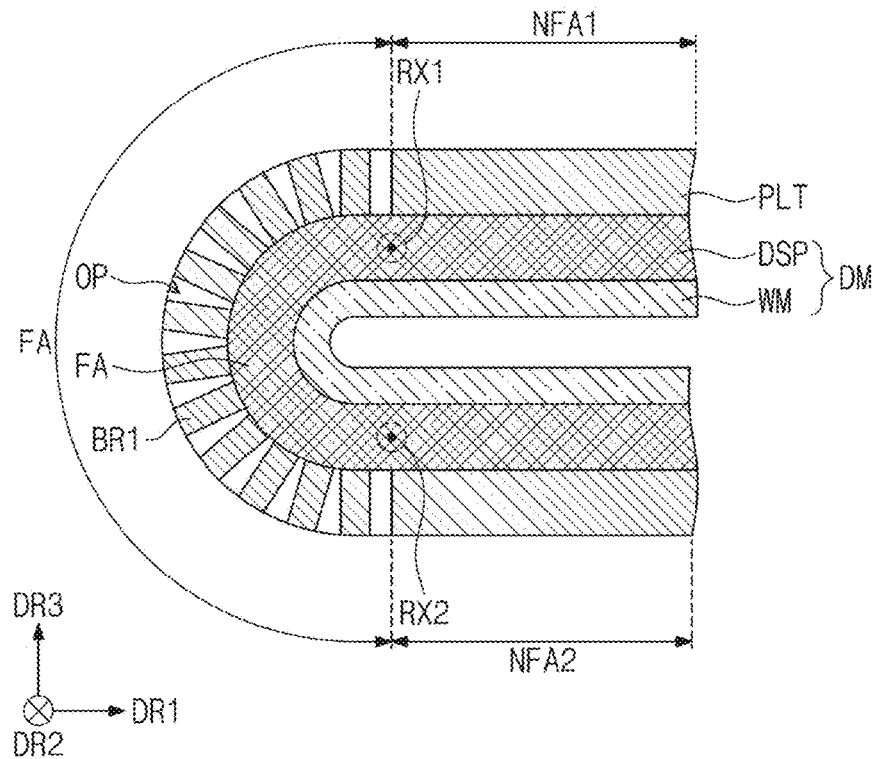

FIGS. 9A and 9B are cross-sectional views of an embodiment of a display device according to the disclosure.

FIG. 9A is a view illustrating a case in which a folding plate portion PLF of a support plate PLT is unfolded. FIG. 9B is a view illustrating a case in which the folding plate portion PLF of the support plate PLT is folded.

In FIGS. 9A and 9B, a display module DM and a window module WM are illustrated as a single layer, and detailed components of the display module DM and the window module WM are not illustrated.

Referring to FIG. 9A, the gaps between adjacent first branch portions BR1 may approach 0 micrometer (lam). Openings OP may have a slit shape as the widths of the openings OP approach 0 μm. The openings OP may be visible as the widths of the openings OP approach 150 μm.

Referring to FIG. 9B, the gaps between the adjacent first branch portions BR1 may be made larger when the folding plate portion PLF of the support plate PLT is folded than when the folding plate portion PLF of the support plate PLT is unfolded. The widths of the openings OP having a slit shape may be made larger when the folding plate portion PLF is folded than when the folding plate portion PLF is unfolded.

Figure 10A:
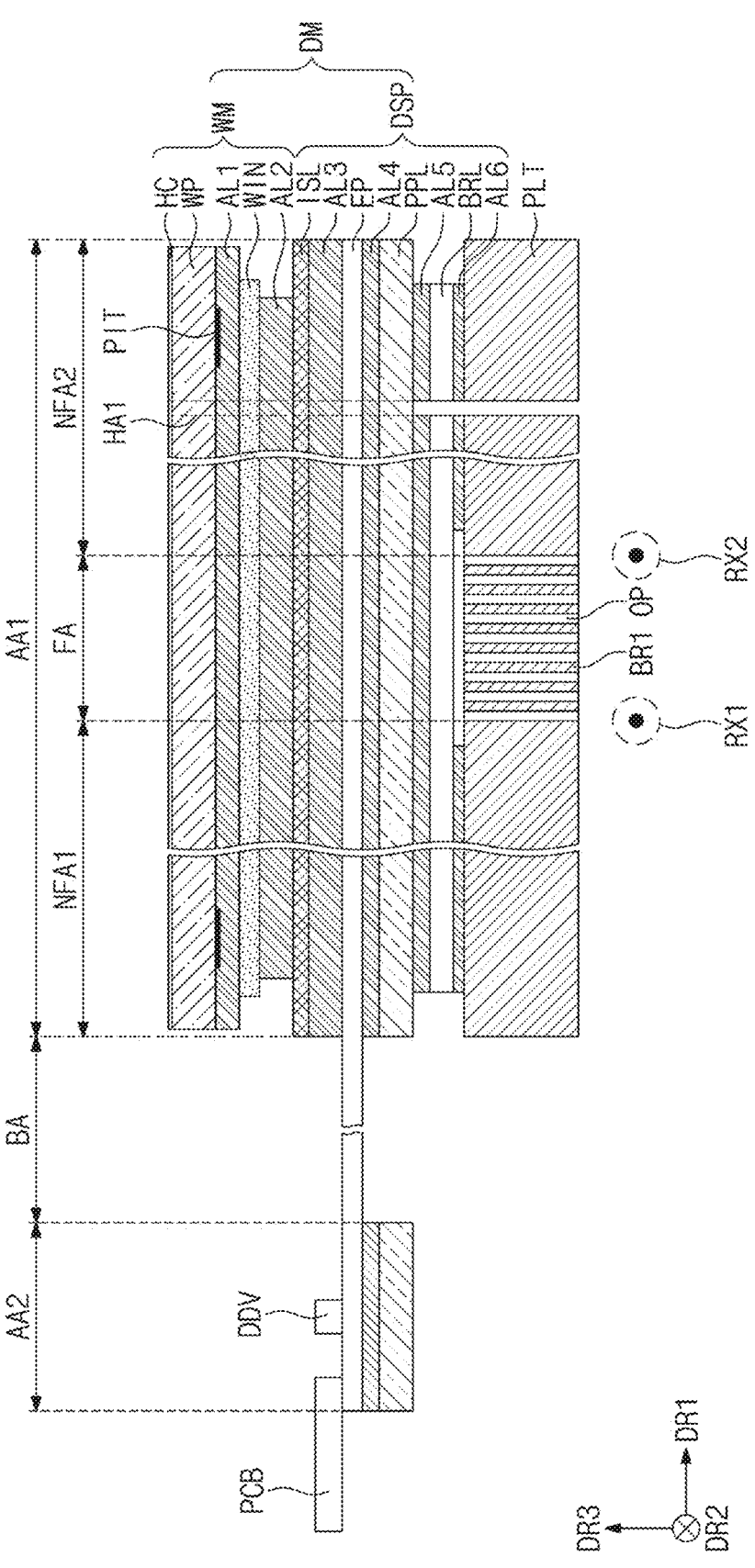
FIGS. 10A and 10B are cross-sectional views of an embodiment of a display module according to the disclosure.
Figure 10B:
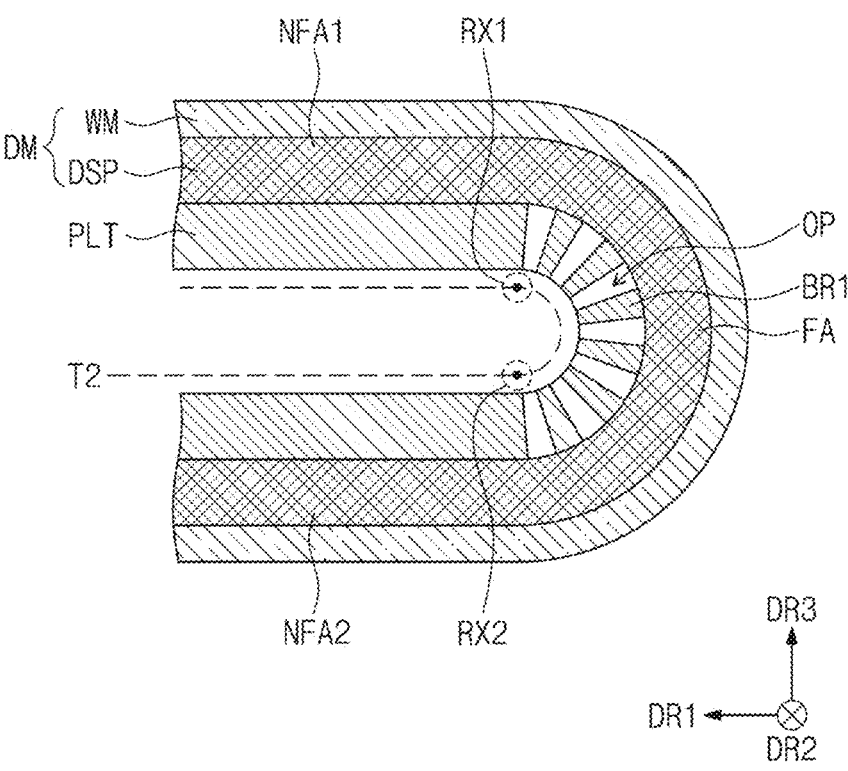

FIGS. 10A and 10B are cross-sectional views of a display module according to the disclosure.

FIG. 10A is a cross-sectional view taken along line I-I' illustrated in FIG. 5, for example. FIG. 10B is a view illustrating a folded state of the display device illustrated in FIG. 10A.

A window module WM, a display part DSP, and a support plate PLT of FIG. 10A are identical to the window module WM, the display part DSP, and the support plate PLT of FIG. 7A and therefore will be omitted from the description or will be briefly described.

A view illustrating a bent state of a bending region BA of FIG. 10A is identical to FIG. 7B and therefore is omitted.

Referring to FIG. 10A, biaxial rotational axes RX1 and RX2 of the display device DD that is folded outward may be defined under the support plate PLT. The biaxial rotational axes RX1 and RX2 may be defined under an electronic panel EP (e.g., a display panel DP).

Referring to FIG. 10B, when a folding plate portion PLF is folded outward, a first non-folding region NFA1 and a second non-folding region NFA2 may be disposed opposite to each other in the third direction DR3. A first flat portion PLT1 and a second flat portion PLT2 may face each other.

A tensile force may act on the support plate PLT disposed outward of a virtual curve T2 with respect to the virtual curve T2 passing through the biaxial rotational axes RX1 and RX2. The tensile force may act on lower surfaces and upper surfaces of first branch portions BR1 disposed in the support plate PLT.

In an embodiment, the tensile force may act on the support plate PLT, the display part DSP, and the window module WM disposed outward of the virtual curve T2, for example. The tensile force may act on an upper surface and a lower surface of the support plate PLT.

The adjacent first branch portions BR1 may be spaced apart from each other. In an embodiment, the distances between the lower surfaces and the upper surfaces of the adjacent first branch portions BR1 may be made larger when the folding plate portion PLF is folded than when the folding plate portion PLF is unfolded, for example.

The widths of openings OP between the adjacent first branch portions BR1 in the first direction DR1 may be made larger when the support plate PLT is folded than when the support plate PLT is unfolded.

Accordingly, when a display module DM is folded, the adjacent first branch portions BR1 may be spaced apart from each other, and an interference phenomenon in which the adjacent first branch portions BR1 contact each other may not occur.

Figure 11:
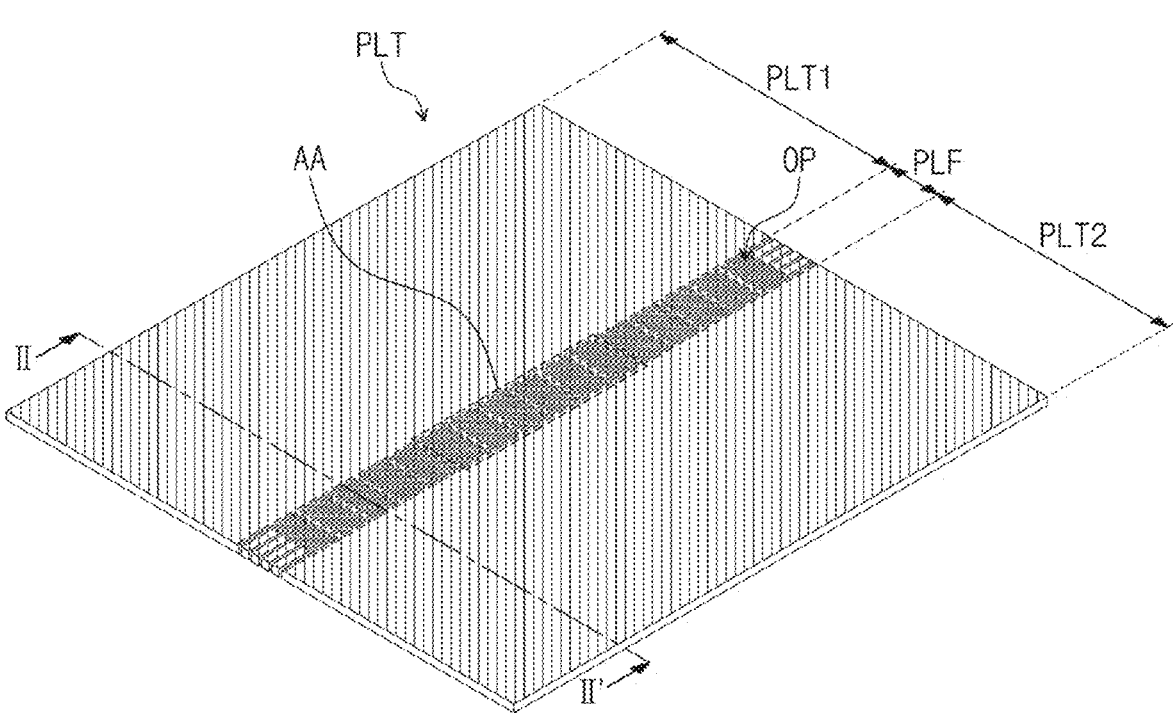
FIG. 11 is a perspective view of the support plate illustrated in FIGS. 7A and 10A.
Figure 11:
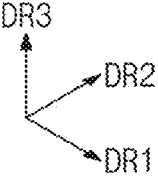

FIG. 11 is a perspective view of the support plate illustrated in FIGS. 7A and 10A.

Referring to FIG. 11, the support plate PLT may include the first plat portion PLT1, the folding plate portion PLF, and the second flat portion PLT2. The folding plate portion PLF may be disposed between the first plat portion PLT1 and the second flat portion PLT2. The first plat portion PLT1, the folding plate portion PLF, and the second flat portion PLT2 may be arranged in the first direction DR1. The first flat portion PLT1 and the second flat portion PLT2 may overlap the first non-folding region NFA1 and the second non-folding region NFA2 illustrated in FIGS. 7A and 10A. The folding plate portion PLF may overlap the folding region FA illustrated in FIGS. 7A and 10A.

A grid pattern may be defined in the folding plate portion PLF. In an embodiment, the plurality of openings OP may be defined in the folding plate portion PLF, for example. The openings OP may be arranged according to a predetermined rule. The openings OP may be arranged in a grid form to form a grid pattern in the folding plate portion PLF.

Since the openings OP are defined in the folding plate portion PLF, the area of the folding plate portion PLF may be decreased, and thus the stiffness of the folding plate portion PLF may be lowered. Accordingly, when the openings OP are defined in the folding plate portion PLF, the flexibility of the folding plate portion PLF may be improved, as compared with when the openings OP are not defined in the folding plate portion PLF. Thus, the folding plate portion PLF may be more easily folded.

However, when the widths between the openings OP are increased, a difference in impact resistance between the flat portions PLT1 and PLT2 and the folding plate portion PLF may be increased. As described above with reference to FIGS. 7C and 10B, the widths of the openings OP may be reduced when the biaxial rotational axes RX1 and RX2 are defined over or under the support plate depending on the folding direction. In this case, the impact resistance of the folding plate portion PLF may be improved at the same time that the folding plate portion PLF is easily folded.

Figure 12:
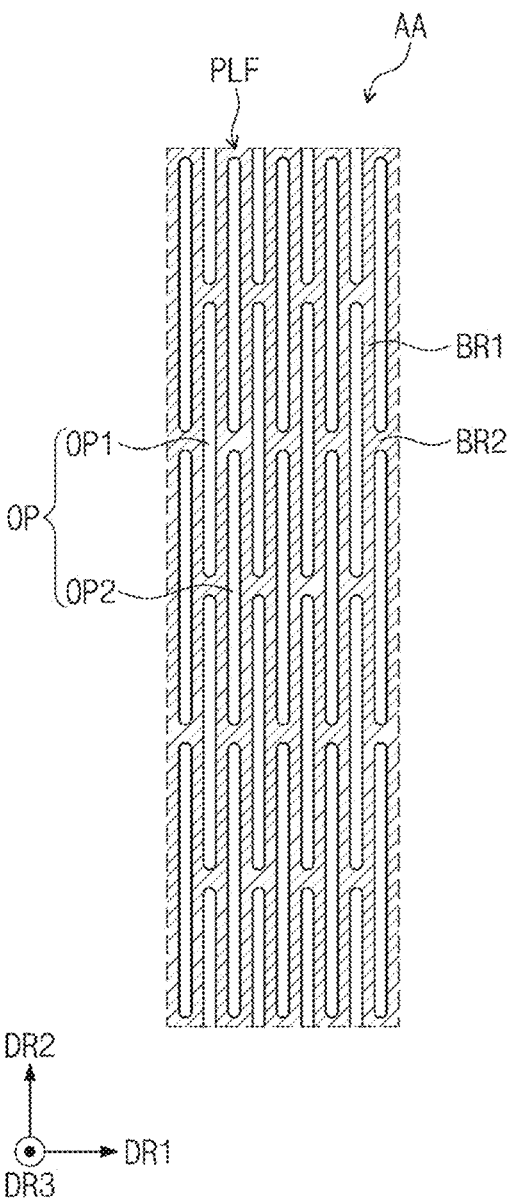
FIG. 12 is an enlarged view of region AA illustrated in FIG. 11.
Figure 13:
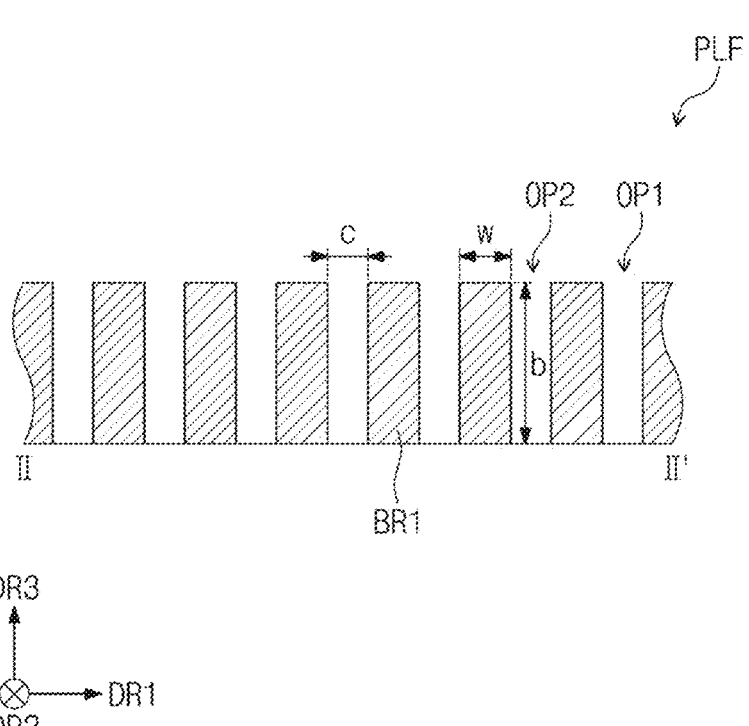
FIG. 13 is a cross-sectional view taken along line II-II' of FIG. 11.
Figure 14A:
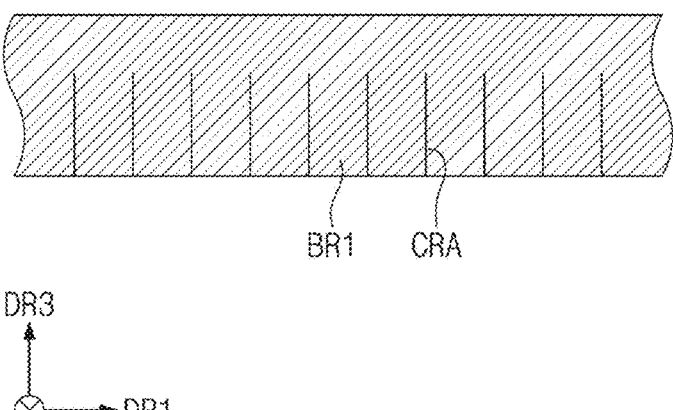
FIGS. 14A and 14B are views illustrating a portion of the folding plate portion illustrated in FIGS. 9A and 9B.
Figure 14B:
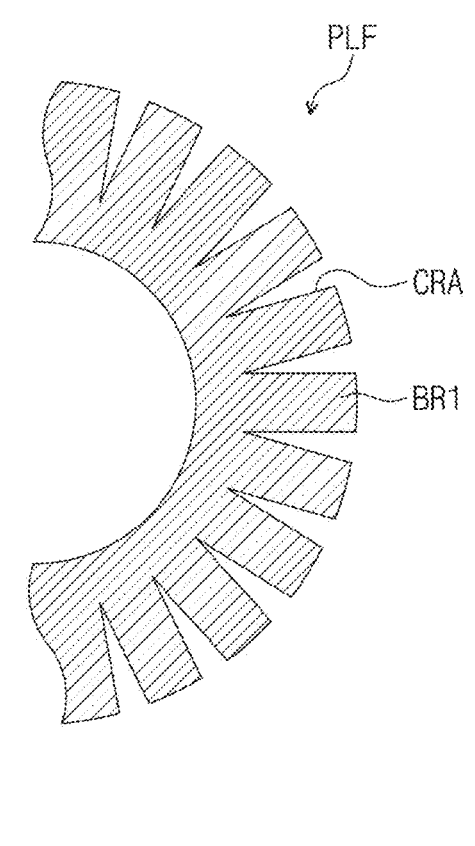
Figure 14B:
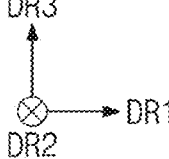

FIG. 12 is an enlarged view of region AA illustrated in FIG. 11. FIG. 13 is a cross-sectional view taken along line II-IF of FIG. 11. FIGS. 14A and 14B are views illustrating a portion of the support plate illustrated in FIGS. 9A and 9B.

Referring to FIG. 12, the openings OP may be arranged in the first direction DR1 and the second direction DR2. The openings OP may extend longer in the second direction DR2 than in the first direction DR1. That is, the openings OP may extend in a direction parallel to the above-described biaxial rotational axes RX1 and RX2.

The openings OP may include a plurality of first openings OP1 arranged in the second direction DR2 and a plurality of second openings OP2 arranged in the second direction DR2 so as to be adjacent to the first openings OP1 in the first direction DR1. The first openings OP1 may be staggered with respect to the second openings OP2.

The support plate PLT may include first branch portions BR1 disposed between the openings OP adjacent to each other in the first direction DR1 and second branch portions BR2 disposed between the openings OP adjacent to each other in the second direction DR2. The first branch portions BR1 may extend in the second direction DR2, and the second branch portions BR2 may extend in the first direction DR1. The openings OP may be defined by the first and second branch portions BR1 and BR2.

Referring to FIGS. 13, 14A, and 14B, the widths w of the first branch portions BR1 in the first direction DR1 may range from 50 μm to 200 μm. The heights b of the first branch portions BR1 in the third direction DR3 may range 50 μm to 150 μm. The widths w and heights b of the first branch portions BR1 may be determined in proportion to the radius of curvature of the folding region FA. In an embodiment, when the radius of curvature is 1.5 mm, the widths w may be 100 μm, and the heights b may be 150 μm, for example. The widths c of the openings OP defined between the adjacent first branch portions BR1 may be greater than 0 μm and less than or equal to 150 μm.

When the widths of the openings OP approach 0 μm as illustrated in FIG. 14A, the openings OP may have a slit shape. Slits CRA may be disposed between the adjacent first branch portions BR1. In an embodiment, the slits CRA may be formed through a laser process, for example.

The slits CRA may be arranged in the first direction DR1. Although not illustrated, the slits CRA may extend in the second direction DR2. The slits CRA may extend from lower surfaces of the first branch portions BR1 in the third direction DR3. The slits CRA may extend to half of the heights b of the first branch portions BR1.

When the folding plate portion PLF is unfolded, the adjacent first branch portions BR1 may be connected to each other. When the folding plate portion PLF is folded, the adjacent first branch portions BR1 may be spaced apart from each other.

The biaxial rotational axes RX1 and RX2 may be defined over the support plate PLT when the folding plate portion PLF is folded inward. The biaxial rotational axes RX1 and RX2 may be defined under the support plate PLT when the folding plate portion PLF is folded outward.

The widths between the first branch portions BR1 may be increased when the folding plate portion PLF is folded inward. The widths of the slits CRA defined in the support plate PLT may be increased when the folding plate portion PLF is folded inward.

The widths between the first branch portions BR1 may be increased when the folding plate portion PLF is folded outward. The widths of the slits CRA defined in the support plate PLT may be increased when the folding plate portion PLF is folded outward.

The widths of the slits CRA defined between the adjacent first branch portions BR1 are made larger when the folding plate portion PLF is folded than when the folding plate portion PLF is unfolded. Accordingly, an interference phenomenon in which the adjacent first branch portions BR1 contact each other may be prevented.

By the embodiments of the disclosure, the biaxial rotational axes may be disposed over or under the support plate depending on a folding direction of the display panel. In this case, a tensile force may act on the support plate when the support plate is folded. Due to the tensile force, the widths of the openings defined between the branch portions of the folding plate portion of the support plate are made larger in a folded state than in an unfolded state. Accordingly, an interference phenomenon in which the adjacent branch portions contact each other may be prevented.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:
an electronic panel including a first non-folding region, a folding region, and a second non-folding region arranged in a first direction;
a support plate disposed under the electronic panel; and
a hinge member which defines biaxial rotational axes spaced apart from each other in the first direction and extends in a second direction crossing the first direction,
wherein the electronic panel is folded inward or outward about the biaxial rotational axes, and
wherein the biaxial rotational axes are defined over or under the support plate in an unbent state depending on a folding direction of the electronic panel in a manner that the biaxial rotational axes are defined only outside the support plate.

2. The display device of claim 1, wherein the biaxial rotational axes are defined over the support plate when the electronic panel is folded inward by rotating about the biaxial rotational axes.

3. The display device of claim 2, wherein the biaxial rotational axes overlap the electronic panel when the electronic panel is folded inward.

4. The display device of claim 2, wherein the biaxial rotational axes are defined over the electronic panel when the electronic panel is folded inward.

5. The display device of claim 1, wherein the biaxial rotational axes are defined under the electronic panel when the electronic panel is folded outward by rotating about the biaxial rotational axes.

6. The display device of claim 5, wherein the biaxial rotational axes are defined under the support plate when the electronic panel is folded outward.

7. The display device of claim 1, wherein the support plate includes:
a first flat portion which overlaps the first non-folding region;
a folding plate portion which overlaps the folding region and is foldable together with the electronic panel by the hinge member; and
a second flat portion which overlaps the second non-folding region, and
wherein a plurality of openings arranged in the first direction and the second direction are defined in the folding plate portion.

8. The display device of claim 7, wherein the plurality of openings extends longer in the second direction than in the first direction.

9. The display device of claim 7, wherein the plurality of openings has a width greater than 0 micrometer and less than or equal to 150 micrometers in the first direction when the support plate is unfolded.

10. The display device of claim 7, wherein the folding plate portion includes a plurality of branch portions disposed between the plurality of openings.

11. The display device of claim 10, wherein upper surfaces of the plurality of branch portions have a width of 50 micrometers to 200 micrometers in the first direction when the support plate is unfolded.

12. The display device of claim 10, wherein the plurality of branch portions has a thickness of 50 micrometers to 150 micrometers in a third direction crossing the first direction and the second direction when the support plate is unfolded.

13. The display device of claim 7, wherein the plurality of openings is defined by performing half-cutting on a lower surface of the folding plate portion.

14. The display device of claim 7, wherein a tensile force acts on an upper surface and a lower surface of the folding plate portion when the folding plate portion is folded inward or outward.

15. The display device of claim 14, wherein widths of the plurality of openings in the first direction when the folding plate portion is folded inward are greater than widths of the plurality of openings in the first direction when the folding plate portion is unfolded.

16. The display device of claim 14, wherein widths of the plurality of openings in the first direction when the folding plate portion is folded outward are greater than widths of the plurality of openings in the first direction when the folding plate portion is unfolded.

17. The display device of claim 14, wherein the folding plate portion includes a plurality of branch portions disposed between the plurality of openings, and
wherein a gap between upper surfaces of two branch portions adjacent to each other in the first direction among the plurality of branch portions when the folding plate portion is folded inward or outward is greater than a gap between the upper surfaces of the two branch portions when the folding plate portion is unfolded.

18. The display device of claim 17, wherein a gap between lower surfaces of two branch portions adjacent to each other in the first direction among the plurality of branch portions when the folding plate portion is folded inward or outward is greater than a gap between the lower surfaces of the two branch portions when the folding plate portion is unfolded.

19. A display device comprising:
an electronic panel including a first non-folding region, a folding region, and a second non-folding region arranged in a first direction;
a support plate disposed under the electronic panel, the support plate including a first flat portion, a folding plate portion, and a second flat portion arranged in the first direction; and
a hinge member which defines biaxial rotational axes spaced apart from each other in the first direction and which extends in a second direction crossing the first direction,
wherein openings arranged in the first direction and the second direction are defined in the folding plate portion,
wherein the folding plate portion includes a plurality of branch portions disposed between the openings, and
wherein widths of the openings in the first direction when the folding plate portion is folded inward or outward are greater than widths of the openings in the first direction when the folding plate portion is unfolded.

20. The display device of claim 19, wherein the electronic panel is folded inward or outward about the biaxial rotational axes, and wherein the biaxial rotational axes are defined over or under the support plate depending on a folding direction of the electronic panel.

\*    \*    \*    \*    \*